Aug. 10, 1926.
D. F. HARBAUGH ET AL
1,595,190
GASKET
Filed April 16, 1925
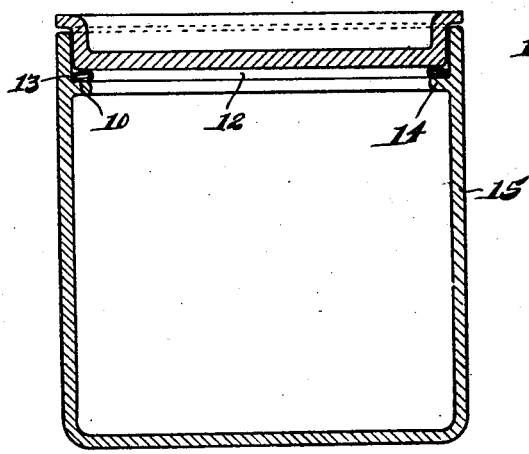
Fig. 1
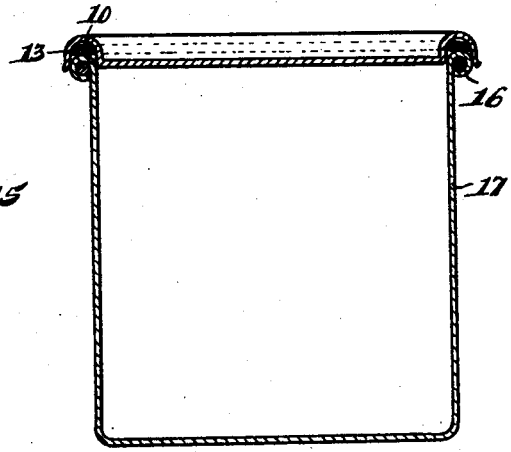
Fig. 2
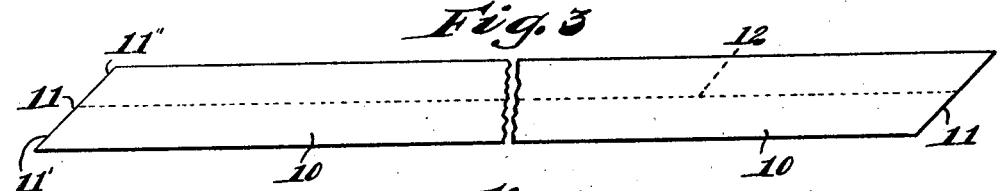
Fig. 3
Fig. 4
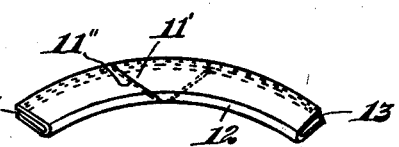
Fig. 6
Fig. 5
Inventors:
Dell F. Harbaugh,
AND
Charles O. Moore,
By Joshua R. H. Potts
their Attorney.
Witnesses:
C. E. Wessels
J. D. Stuwe Patented Aug. 10, 1926.

1,595,190

UNITED STATES PATENT OFFICE.

DELL F. HARBAUGH AND CHARLES O. MOORE, OF CHICAGO, ILLINOIS, ASSIGNORS TO ATLANTIC INDIA RUBBER WORKS, OF CHICAGO, ILLINOIS.

GASKET.

Application filed April 16, 1925. Serial No. 23,458.

Our invention relates to improvements in gaskets, and more particularly to compound gaskets having superposed spaced portions, which are employed where it is desirable to procure as perfect a seal as possible.

It is well known that gaskets of the tubular form when employed as the sealing members in containers such as are used in the shipping of oils, paint and other inflammable products, are inefficient for the reason that when the container is closed the air in the tubular gasket is only compressed and is confined therein. If the closing operation of the container is not sufficiently powerful to explode the gasket at the time of closing, thereby releasing the confined air at once, then the confined air escapes by seepage, by explosion, through change of temperature, or by being released due to the natural solvent action of one or more of the ingredients in the container. If the air has not been released from the tubular gasket at the time of closing the container, then as soon as its releasement is effected the cover of the container will be loose and the desired seal of the container will be broken.

The general object and purpose of our invention is to provide a gasket which will release the confined air from within the gasket during the process of closing the container, especially such container as is used in the shipping of inflammable products.

A particular object of our invention is to provide a gasket of the trindle variety, which when pressed in position and subjected to compression will, during the compressing operation, expel the contained air that is otherwise compressed in the usual gasket of tubular form.

A further object of our invention is the production of a highly efficient gasket that is of substantially even thickness throughout and will eliminate the necessity of any overlapping and thickened portion and any additional connecting member at the connected ends of the gasket, as is usual in gaskets formed from tubular material.

A still further object of our invention is the provision of a highly efficient gasket for the sealing of oils, paints and other inflammable products in their containers.

Other objects will appear hereinafter.

The invention consists in the combinations and arrangements of parts hereinafter described and claimed.

The invention will be best understood by reference to the accompanying drawing forming a part of this specification, and in which, Figs. 1 and 2 are vertical sectional views of two types of containers, showing our invention mounted in position thereon;

Fig. 3 is a view of a strip of material from which our gasket is formed;

Fig. 4 shows the strip folded over along its longitudinal center line;

Fig. 5 is a view of the complete gasket; and

Fig. 6 is a fragmentary perspective view illustrating the connection of the inclined ends of the gasket.

The main purpose of the invention is to provide a gasket which will release the confined air from the gasket during the process of compressing the gasket, that is, during the closing of the container; and for the purpose of the present invention it appears that the trindle form of gasket is the preferable form, in that there is no additional means or member required, in order to shape it into symmetrical form and to connect the ends of the material from which the gasket is shaped. The inventors have also found that tubular gaskets when properly punctured will perform the releasement of contained air by the compression of the gasket during the process of closing the containers wherewith the gaskets are used, but such tubular gaskets usually have their ends connected and form a resultant hump at the point of union, which is highly objectionable because leaking of the contents of the container often occurs therefrom at this point of union, whether the contained air in the gasket has been effectually expelled or not.

The construction illustrated consists of a strip or band of somewhat pliable material, as rubber, or other suitable material, which has its ends 11 cut at a slant, as indicated in Fig. 3. This strip or band is folded or doubled over along its longitudinal center line 12, as indicated in Fig. 4, thus forming a substantially trough shaped member or trindle member, that is, will form a gasket which is trough shaped in cross-section, and the bevelled ends thereby each forming an outwardly extending part 11′ and an inwardly extending part 11″. These ends are then brought together into a butt connection, and thereby the part 11′ of one end will engage the part 11″ of the other end in butt relation, while the two parts 11′ are overlapped which are then fastened together by means of adhesive material, such as rubber cement or the like.

This forms a gasket of compound or superposed parts which are closed along one edge, that is the center line 12, and are open along the other edge 13, and when the gasket is compressed, the air from the space between the superposed parts will readily escape outward through the open edge 13.

The gasket is placed in position, with its closed edge 12 placed inwardly and its open edge 13 placed outwardly as shown on the inner flange 14 of the container 15 in Fig. 1, and as shown on the top rim 16 of the container 17 in Fig. 2.

It is apparent from the above disclosure that with this form of gasket the air can readily escape therefrom when the gasket is compressed, during the closing of the container; and furthermore that the ends of the strip or band forming the gasket, are securely joined in butt connection without thickening or forming a hump at such connection and without using any additional reinforcing member to fasten such ends together.

While we have illustrated and described the preferred form of construction for carrying our invention into effect, this is capable of variation and modification without departing from the spirit of the invention.

We, therefore, do not wish to be limited to the precise details of construction set forth, but desire to avail ourselves of such variations and modifications as come within the scope of the appended claims.

Having described our invention, what we claim as new and desire to secure by Letters Patent is:

1. An article of manufacture including a band of pliable material having its end slanting on a straight line and symmetrically, said band being folded over on its longitudinal center line, and the ends being fastened together in butt relation to form a gasket so that the beveled joining ends overlap without forming a thickened connection, said gasket being substantially trough-shaped in cross section, and being open along its outer edge.

2. As an article of manufacture, a gasket consisting of a strip of rubber having its ends symmetrically slanted, said strip being folded and doubled over along its longitudinal center line and the slanted ends being brought together in butt connection, the outward parts of said slanted ends being overlapped and fastened together with adhesive material, said gasket being substantially trough shaped in cross-section and open along its outer edge.

In testimony whereof we have signed our names to this specification.

DELL F. HARBAUGH.
CHARLES O. MOORE.